May 6, 1930.  J. N. REINERT  1,757,058
MILK AND CREAM COOLER
Filed July 6, 1928
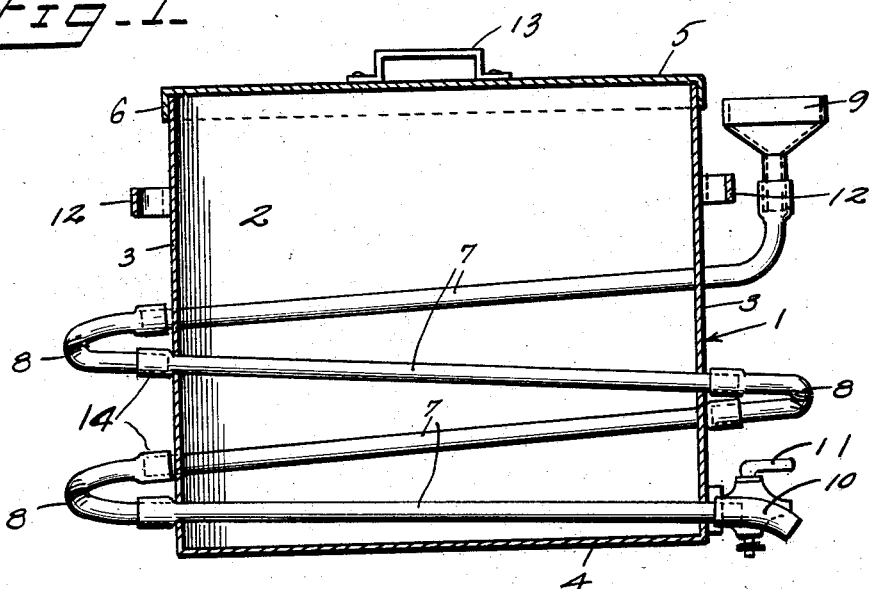
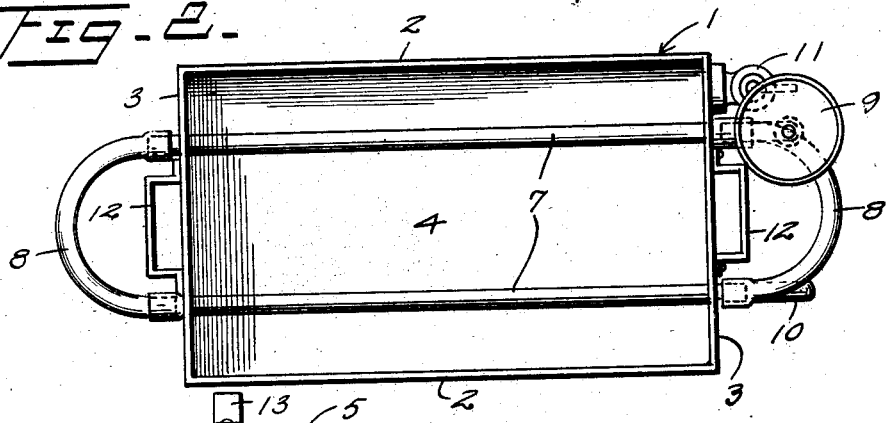
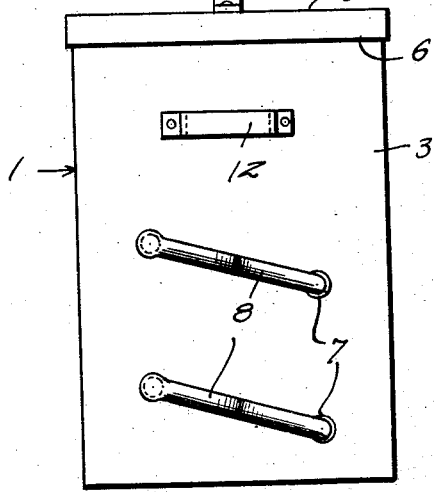
Inventor
J. N. Reinert
By Watson E. Coleman
Attorney Patented May 6, 1930

1,757,058

UNITED STATES PATENT OFFICE

JOHN N. REINERT, OF BIRD ISLAND, MINNESOTA

MILK AND CREAM COOLER

Application filed July 6, 1928. Serial No. 290,856.

This invention relates to a milk or cream heating or cooling device and has for its primary object to provide, in a manner as hereinafter set forth, an improved apparatus of this character which is of simple construction and so designed that it may be readily disassembled for cleaning.

Another and important object therefore is to provide a cream or milk cooler or heater which can be kept in a sanitary condition with a minimum amount of labor.

A still further object of the invention is to provide a cream or milk heating or cooling structure having few parts and constructed in a manner which will permit of its being constructed economically.

Further objects and advantages of this invention will be apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a longitudinal sectional view through the milk treating structure;

Figure 2 is a top plan view of the structure with the cover thereof removed;

Figure 3 is an end elevational view of the structure.

As shown in the drawing, the present cooler comprises a main casing body 1 having the side, end and bottom walls 2, 3 and 4 respectively and a removable top or cover 5, the cover being provided with a surrounding depending flange 6 which engages around the outer faces of the side and end walls to maintain the receptacle tightly closed.

The receptacle 1 is preferably of vertically elongated rectangular cross sectional design as shown in Figure 3, and has extending longitudinally therethrough a series of pipes 7 which are arranged in two groups positioned side by side, the pipes of one group being arranged in a slightly higher plane than those in the adjacent group. In addition to the arrangement described, each pipe of each group is arranged at an inclination, each of the pipes of one group inclined oppositely to the associate pipe of the other group. Each of the pipe sections 7 extends at its ends through an end wall of the casing and exteriorly of the casing the ends of the pipes of one group are connected to the adjacent ends of the pipes of the other group by the return bends 8 which are detachably connected therewith.

It will be readily seen from this that liquid introduced into the funnel 9 which is detachably connected to one end of the highest pipe in one group will flow downwardly and back and forth through the casing to the lowermost pipe of the other group discharging through the detachable outlet nozzle 10 which is coupled with one end of the said lowermost pipe, in the manner shown.

The casing 1 is provided with a drain faucet 11 by means of which liquid contents of the casing may be drawn off. The casing is also provided at each end with a handle member 12 and a handle 13 is also secured to the top or cover 5.

In the use of the present structure, if it is desired to cool milk or cream as the same flows from a separator or under any other conditions, the receptacle 1 is filled with water cooled to the proper temperature and warm milk is poured into the detachable funnel 9 and allowed to flow back and forth through the cool water in the receptacle, through the pipes 7, finally discharging from the outlet nozzle 10.

While the description of the present structure has been confined to two groups of pipes 7 it is, of course, to be understood that I do not wish to limit myself to the specific details for it is obvious that any number of groups of pipes may be employed.

In order to further facilitate the disassembling of the present structure, each of the return bends has one end enlarged as indicated at 14, while the projecting end of the pipe 7 into which the other end discharges is similarly enlarged to receive the said other end of the return bend. With this construction, each of the return bends may be quickly removed so that a cleaning brush may be introduced into the pipes 7 and after cleaning the bends, may be as quickly returned to position.

The same method is employed for coupling the funnel and the discharge nozzle with their respective pipes so that these elements may be easily and quickly removed and replaced.

From the foregoing description, it will be readily seen that while the present device may be used on a large scale in dairies for milk cooling, it may also be made smaller for use in the home and may, therefore, be universally used.

While the present structure has been described as an apparatus for heating or cooling milk by the introduction of liquid into the receptacle 1 such as hot water, it is, of course, obvious that steam or hot or cold air may be introduced into the receptacle in the place of hot water.

Having described my invention, what I claim is:—

A milk cooling device of the character described, comprising a receptacle, a plurality of tubes extending through said receptacle between and through opposite walls and arranged in vertically spaced relation and further being inclined in the receptacle, a plurality of tubes arranged at one side of the first mentioned tubes and arranged in vertically spaced relation in and extending at their ends through said opposite walls and inclined oppositely to the first mentioned tubes, the upper one of said first mentioned tubes having its highest end turned to extend vertically exteriorly of the receptacle, means connected with said upturned end to facilitate introduction of liquid to the tube, return bends connecting the ends of the first mentioned tubes with the adjacent ends of the second mentioned tubes, said bends having frictional slip connection with the tubes, and a lead-off tube connected to the lower end of the lowest one of the last mentioned tubes.

In testimony whereof I hereunto affix my signature.

JOHN N. REINERT.